United States Patent [19]

Santoleri et al.

[11] Patent Number: 4,882,009
[45] Date of Patent: Nov. 21, 1989

[54] APPARATUS FOR CONCENTRATING BRINE WATERS OR DEWATERING BRINES GENERATED IN WELL DRILLING OPERATION

[75] Inventors: Joseph J. Santoleri, Berwyn, Pa.; Richard D. Ross, Moorestown, N.J.

[73] Assignee: Four Nines, Inc., Plymouth Meeting, Pa.

[21] Appl. No.: 72,518

[22] Filed: Jul. 13, 1987

[51] Int. Cl.$^4$ .......................... B01D 1/18; B01D 1/14
[52] U.S. Cl. ................................... 159/4.2; 159/16.1; 159/48.1; 159/901; 159/DIG. 2; 166/57; 166/267; 175/66; 202/176; 202/197; 202/233; 202/236; 203/10; 203/12; 203/22; 203/40; 203/49; 203/90; 203/DIG. 8; 203/DIG. 17; 422/244; 422/245
[58] Field of Search ..................... 159/3, 47.3, DIG. 2, 159/40, 4.2, 18, 48.1, 16.1, 901; 422/244, 245; 166/57, 267; 175/66; 202/176, 233, 236, 197; 23/307; 55/191, 192; 203/DIG. 8, 22, DIG. 17, 10, 12, 90, 40, 49, 78; 126/360 A; 261/78.1, DIG. 56

[56] References Cited

U.S. PATENT DOCUMENTS

| 123,181 | 1/1872 | Leckie | 159/16.1 |
|---|---|---|---|
| 1,335,398 | 3/1920 | Sieck, Jr. et al. | 260/409 |
| 1,415,443 | 5/1922 | Hechenbleikner et al. | 23/307 |
| 1,461,640 | 7/1923 | Wirth-Frey | 159/16.3 |
| 3,212,559 | 10/1965 | Williamson | 23/307 |
| 3,276,510 | 10/1966 | Austin et al. | 23/307 |
| 3,285,834 | 11/1966 | Guerrieri et al. | 203/11 |
| 3,290,229 | 12/1966 | Brown | 202/177 |
| 3,488,261 | 1/1970 | Loebel | 203/26 |
| 3,638,708 | 2/1972 | Farin | 159/402 |
| 3,732,911 | 5/1973 | Lowe et al. | 159/47.3 |
| 3,738,353 | 6/1973 | Santoleri | 126/360 A |
| 3,743,483 | 7/1973 | Shah | 159/4.02 |
| 3,884,768 | 5/1975 | Griffith | 203/11 |
| 4,167,437 | 9/1979 | Gilbert | 159/28.4 |
| 4,210,494 | 7/1980 | Rhodes | 203/49 |
| 4,245,998 | 1/1981 | Okouchi et al. | 23/295 R |
| 4,603,035 | 7/1986 | Cornell et al. | 261/DIG. 54 |

Primary Examiner—Virginia Manoharan
Attorney, Agent, or Firm—Ferrill and Logan

[57] ABSTRACT

A brine concentrator utilizing two separate concentrating devices in combination wherein a first concentrating device comprises a plurality of serpentine pipes interposed within a concentrator tank containing a dilute brine solution and a second concentrating device, including a venturi, is attached to the upper end of the concentrator tank and connected to receive exhaust gases from an exterior source. The brine solution which has been concentrated by the first concentrating device exit the tank through an output opening and is introduced into the venturi via a plurality of nozzles where it is mixed with the exhaust gases.

A venting stack is also attached to the upper end of the tank for venting the exhaust gases emitted from the venturi and pre-heating dilute brine solution, which is introduced into the tank through the venting stack. As the solution travels down the stack and into the tank, it comes into contact with the exhaust gases exiting the tank from the venturi. A heat transfer occurs between the exiting exhaust gases and the entering dilute brine solution, thereby raising the temperature of the solution.

6 Claims, 2 Drawing Sheets

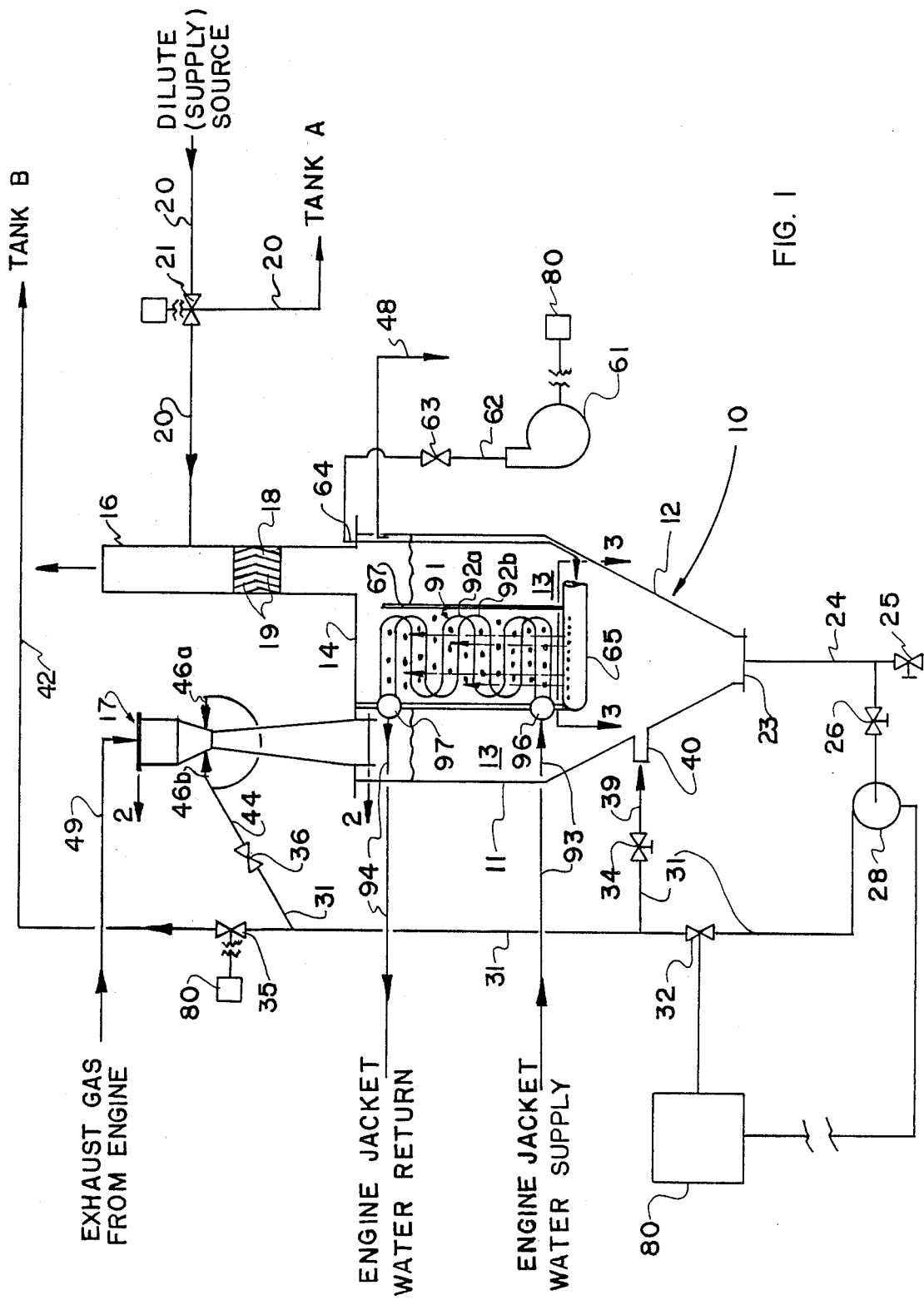

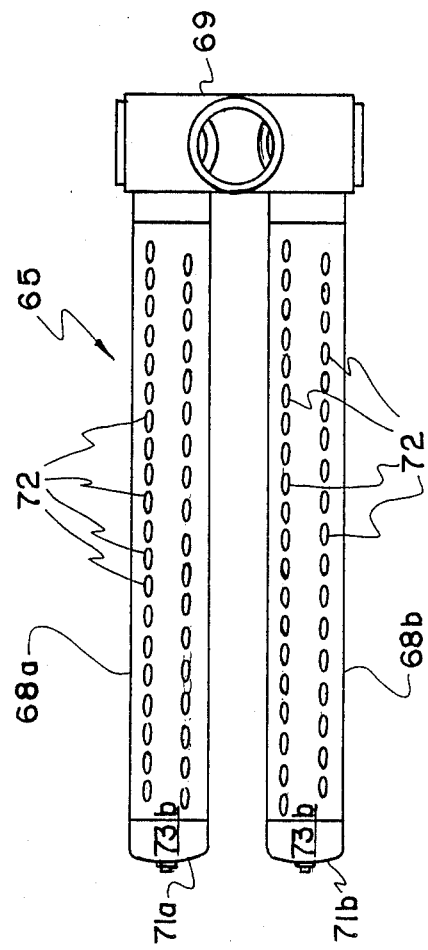
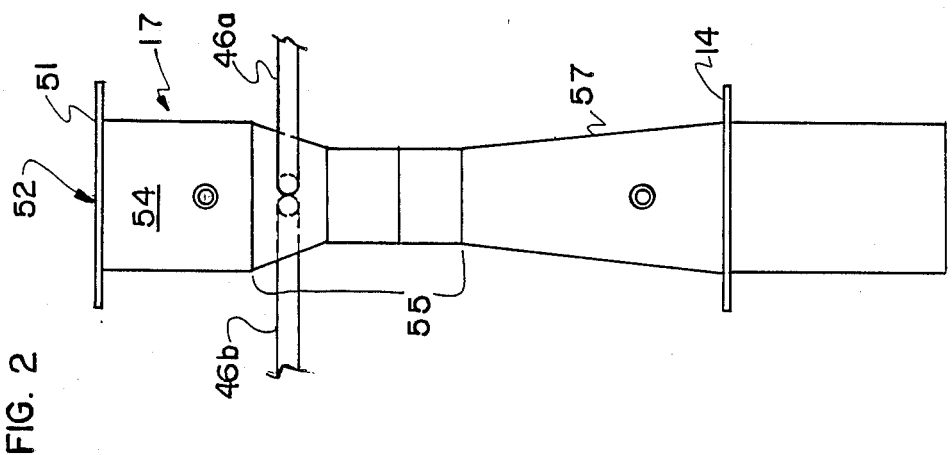

APPARATUS FOR CONCENTRATING BRINE WATERS OR DEWATERING BRINES GENERATED IN WELL DRILLING OPERATION

BACKGROUND OF THE INVENTION

This invention relates to an apparatus and a method for concentrating a solution containing salts. More particularly, the invention relates to an apparatus that may be used at the site of an oil or gas drilling operation and that uses the available energy from drilling operations to concentrate the solution. Other sites where brackish or waste waters are collected and stored, such as in lagoons, would also use this apparatus.

The operations necessary to drill an oil or gas well, and pump the natural product to the surface for processing, almost invariably result in large amounts of brackish waste water. The company running the drilling or storage operations must properly dispose of this waste water with an environmentally safe method as recent studies have shown that sources of potable water for humans are being depleted by declining water tables, by pollution of surface sources or by the salting-up of ground and river waters. As established by the U.S. Public Health Service, water for human consumption should contain no more than 500 parts per million (ppm) of dissolved solids. Seawater contains about 35,000 ppm; brackish water is generally classified as containing 1,000 ppm. Many specialized plants have been built around the world to accomplish the job of sufficiently removing salt from water sources. Although the number of plants built over the last decade to purify salt water has increased dramatically, so has the amount of energy needed to keep these plants operational. Indeed, the cost to build and run any of these plants places them out of reach of most small to medium-sized oil or gas drilling operations which normally must dispose of a large amount of salt water from daily operations. Faced with the high cost of changing brackish water brought up from the ground along with the gas or oil into usable water, many wells simply choose to transport it away by truck. This transportation cost must be added into the total cost of producing the fuel, increasing the final cost to the consuming public.

It is known to use hot gases to remove salts from industrial waste waters. U.S. Pat. No. 4,245,998 to Okouchi et al discloses a method and apparatus wherein hot air is injected downward into a concentrator containing a salt solution thereby enhancing an evaporation efficiency in the concentrator preventing scale deposition in the concentrator and piping system. At a later stage therein, cool air is forced onto a crystalizer to make salt crystals for disposal.

Another invention, described in U.S. Pat. No. 3,882,844 to Ohara et al, discloses a submerged hot gas exchanger that has a combustion gas sparge pipe connected thereto. The hot combustion gases are forced through apertures in the upper surface of the sparge pipe and are violently mixed with a heat exchange liquid surrounding the sparge. The resulting liquid flows past a series of heat-exchanger pipes and transfers heat to a cooler liquid therein.

Although both of these inventions show that it is possible to use hot gases to evaporate or concentrate liquids, neither uses a dual-method approach as disclosed in the attached specification.

SUMMARY OF THE INVENTION

A brine concentrating apparatus comprises a generally conically shaped tank having a roof covering its top end and an outlet valve and piping leading out of the bottom end. A venturi-shaped nozzle leading into the tank through the roof is connected to receive exhaust gases from a source adjacent the tank. Also, an exhaust stack leads from inside the tank to the atmosphere, with the stack having at a predetermined location midway of its length piping and connection valves leading to a source of dilute salt water that has been pumped out of a gas well. The piping, leading from the bottom end of the tank, is connected to valves that either divert concentrated brine to a holding tank or recycle it back into the tank.

Inside the tank is a weir suspended from the roof and attached at the lower end of the weir is an air sparger. The air sparger is connected through suitable piping to a source of pressurized air located outside of the tank and has a plurality of bubble-producing holes of predetermined size along its upper surface. A plurality of coil tubes are arranged above the sparger connected to receive fluid from outside the tank through an inlet and discharge said fluid outside the tank through an outlet.

It is an object of the present invention to provide an apparatus and method that can be used at the site of a gas or oil well or storage site to collect and concentrate salt or brackish water brought up from the ground for disposal.

It is another object of the present invention to provide an apparatus and method that can be used at the site of a gas or oil well or brine water collection site that uses excess heat energy produced at the site to concentrate salt water brought up from the ground for disposal.

It is a still further object of the present invention to provide an apparatus and method that can be used at the site of a gas or oil well, or brine water collection site, that achieves an environmentally-safe disposal in the reduction of salt water pumped out of said well.

These and other objects and many attendant advantages of the present invention will be readily appreciated by reference to the following detailed description when considered in connection with the accompanying drawings and the appended claims.

BRIEF DESCRIPTION OF THE DRAWINGS

FIG. 1 is, in schematic form, a front elevation view of the brine concentrator of the present invention.

FIG. 2 is an enlarged perspective view of venturi-pipe of FIG. 1; and

FIG. 3 is a plan view of sparger taken along lines III—III of FIG. 1.

DETAILED DESCRIPTION OF THE PREFERRED EMBODIMENT

As seen in FIG. 1, the brine concentrator of the present invention is comprised of a concentrator tank 10 of predetermined volume of brine 13 and having a conically-shaped bottom section 12 and a flat roof 14. A cylindrical stack 16 is carried by the roof 14 and connected with the interior of the tank to carry away exhaust gases and steam. Also, a venturi-shaped feeder pipe 17 is connected through said roof 14 with the interior of the tank spaced from the stack 16. The stack 16 has a mist-eliminator 18 constructed therein at generally the midpoint thereof to prevent water droplets that are larger than approximately 20 microns from being carried up the stack by the upward movement of gases. The mist-eliminator 18 is made of a series of chevron-shaped baffles 19 as is known in the art. Immediately above mist-eliminator 18, a feed pipe 20 is connected into the side of stack 16. The pipe 20 is connected at its opposite end to a source of dilute brine in a tank A (not shown). A pump (also not shown) is connected into pipe 20 to cause a stream of dilute brine to flow from tank A at a rate, regulated by valve 21, into the stack 16 or to be diverted through pipe 20 back into the source tank A if a malfunction occurs.

In the preferred embodiment of the present invention, tank 10 is made by welding a steel-plated ring 11 of predetermined height and diameter to a steel-plated, cone-shaped section 12 to make a watertight container. The tank 10 is supported by conventional bracing structure (not shown) to allow heavier, concentrated brine to fall into the lower end of the cone. This lower end has an opening 23 therethrough. Connected to the opening 23, through piping 24 and a valve 26, is a discharge and recycle pump 28 (such as a Gould model #3656 100 gal/min., bronze-fitted 3 HP pump). The piping 24 also leads to a brine shut-off valve 25 which leads to a drain (not shown). Valves 25 and 26 can be Flexible Valve series 7100, or similar models. Piping 31 leads from pump 28 to either shut-off valves 34 or 35 (all similar to valves 25 or 26).

Piping 31 leads out of pump 28, through valve 32 and to the valves 34, 35 and 36. The valve 34 is connected into the cone section 12 of the tank by way of a pipe 39 through the opening 40 to allow concentrated brine to be re-cycled back into the tank 10. Piping 42 leads from the valve 35 to a storage tank B (not shown) for storage of concentrated brine that will be carried from the site. Piping 44 leads out of valve 36 and is connected into a pair of nozzles 46a, 46b that spray brine into the venturi 17, as described hereafter. An overflow pipe 48 is connected through an opening 47 in the tank wall 11 to the product storage tank A (not shown) and allows an excess amount of brine, as described below, to escape from the tank 10.

The venturi tube 17, as seen in FIG. 2, is constructed to receive exhaust gases near temperatures of 1000 degrees F. from a diesel or gas turbine engine nearby (neither of which are shown) through ducting 49, which ducting is joined to a flange 51 at the top of an entryway opening 52 to the venturi 17, and mix these hot gases with the re-cycled concentrated brine from nozzles 46a, 46b. The dimensions of the entryway opening 52, introductory section 54, throat section 55, and discharge section 57 are preferably sized to allow approximately six inches of pressure drop from entry to discharge. Nozzles 46a, 46b are sealingly joined at diametrically opposite positions into the throat section 55 to impart a clockwise-directional motion to brine introduced therethrough. The force with which the brine is discharged through nozzles 46a, 46b is regulated and, as the exhaust gases reach their highest velocity subsequent to where the brine is introduced, this spinning motion ensures thorough mixing with the brine and transfer of heat thereto.

An air blower 61, such as a New York Blower model #2306A that force air out through a control valve 63 in piping 62 through a connection 64 in the roof 14 to a sparger 65 (see FIG. 3). The sparger 65 is held in place by a weir 67 of a predetermined height and shape, which weir 67 is fixed to the inside of the roof 14. The sparger 65, in the embodiment shown in FIG. 3, is comprised of one or more tubular sections 68a, 68b that extend from a coupling joint 69 joined to piping 62. Sections 68a, 68b are hollow tubes with end caps 71a, 71b fixed to their distal ends and have a plurality of air-releasing holes 72 in the upper surfaces thereof.

The weir 67, as seen in FIG. 1, can have a circular or rectangular perimeter (as is known in the art) and is built large enough to surround all of the holes 72 in the surfaces of tubes 68a, 68b and is attached to those surfaces by conventional means at points 73a, 73b on sections 68a, 68b. Positioned immediately above, and adjacent to, tubes 68a, 68b is a heat exchanger 91. The heat exchanger 91 is comprised of a plurality of serpentine pipes 92a, 92b which are connected through a second coupling joint 96 to an engine jacket water supply pipe 93, which carries hot water at a temperature of above 200 degrees F. from an engine (not shown) located adjacent the tank 11. An exit pipe 94, connected through a third coupling joint 97, returns cooler water, at about 185 degrees F., to the engine jacket. All automatic and electrical controls necessary to the start-up, operation and shut-down of the concentrator are located in the control panel 80.

OPERATION

The concentrator of the present invention is an evaporation system utilizing the waste heat generated by the power source driving an electrical generator at the gas well drilling site. The concentrator can process the brine water by-product of the natural gas well by evaporating water and concentrating the brine solution to approximately 20:1 concentration.

If, for instance, a Caterpillar G342NA diesel engine is used to provide the electrical service, approximately 600,000 Btu/Hr of waste heat is available from the engine jacket and the exhaust. The exhaust gases are sent to the venturi 17 where they are rapidly cooled by direct contact with recycled brine water from tank 11. Throat 55 promotes intimate mixing of the exhaust gases at high velocity with the brine water and creates a highly turbulent region causing rapid heat transfer from the gases to the brine water. This results in heat absorption by the brine and evaporation of the water into the gas stream.

The engine jacket water is pumped through heat exchanger 91, as already explained, and outside air is controlled by valve 63 and sparged through holes 72 in sections 68a, 68b. This sparged air creates bubbles and turbulent action is created by the air in these bubbles lifting and circulating the water around tubes 92a, 92b, these tubes being arranged in an equally-spaced, staggered pattern above sparger 65. This combination of coil spacing and air bubble movement through the coils promotes a very high heat transfer rate from the jacket water on the inside of the tubes to the brine water solution on the outside.

Once the controls are activated and the system is on-line and the proper brine temperature and concentration levels are reached, the system will automatically continue to operate as long as waste heat is available from the engine and brine is available to concentrate. The concentrated brine solution is bled off and discharged to a holding tank (not shown) to await hauling and disposal.

Obviously, many modifications and variations of the present invention are possible in light of the above teachings, and, it is therefore understood that within the scope of the disclosed inventive concept, the invention may be practiced otherwise than specifically described.

What is claimed is:

1. A brine concentrator for concentrating dilute brine solution comprising:

means for providing a first source of heated water;

means for providing a second source of exhaust gases;

a concentrator tank having an inlet opening located at a top end for receiving dilute brine solution and an outlet opening located at a bottom end for discharging concentrated brine solution;

first concentration means interposed within said tank for receiving said heated water from said first source in order to provide a transfer of heat from said heated water to said dilute brine solution in said first concentration means;

air pressure means located within said tank below said first concentration means for generating air bubbles within said first concentration means in order to facilitate the transfer of heat from said heated water to said dilute brine solution within said first concentration means;

a recirculation conduit located below said air pressure means and connected to said outlet opening of said tank for permitting said concentrated brine solution to be recycled back into said tank;

second concentration means attached at said top end of the tank for receiving exhaust gases from said second source and concentrated brine solution recirculated from said outlet opening of said tank to provide a transfer of heat from said exhaust gases to said concentrated brine solution; and venting means also attached at said top end of the tank to provide a passageway through which said exhaust gases from said second concentration means exit said tank, wherein said venting means comprises a stack having one end affixed to said top end of said tank and a second end open to the atmosphere; and means for introducing dilute brine solution into said inlet opening of said tank through said stack.

2. A brine concentrator according to claim 1 wherein said concentrator tank further includes an overflow means adjacent to said top end of the tank for permitting excess dilute brine solution to be removed from said tank.

3. A brine concentrator according to claim 1 wherein said first concentration means comprises a plurality of serpentine fluid-carrying pipes connected at one end to an inlet means for receiving said heated water and connected at a second end to an outlet means for disposing heated water after a transfer of heat from said heated water to said dilute brine solution.

4. A brine concentrator according to claim 1 wherein said air pressure means comprises an air sparger held in place by mounting means and connected to an air blower located outside of said tank.

5. A brine concentrator according to claim 4 wherein said second concentration means comprises a venturi-tube having a plurality of nozzles arranged within a throat section of said venturi, in order to impart a spray of said concentrated brine solution exiting from said outlet opening of the tank in a circular motion.

6. A brine concentrator according to claim 1 further including a series of chevron-shaped baffles interposed within said stack for preventing water droplets from being carried up said stack by upwardly moving exhaust gases within said tank.

* * * * *